(12) United States Patent
Cunningham et al.

(10) Patent No.: US 11,224,818 B2
(45) Date of Patent: *Jan. 18, 2022

(54) SYSTEMS AND METHODS FOR TRANSFER OF RIGHTS PERTAINING TO GAME ASSETS BETWEEN USERS OF AN ONLINE GAMING PLATFORM

(71) Applicant: Mythical, Inc., Sherman Oaks, CA (US)

(72) Inventors: Stephan Cunningham, Pasadena, CA (US); John Linden, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/944,840

(22) Filed: Jul. 31, 2020

(65) Prior Publication Data

US 2020/0360820 A1    Nov. 19, 2020

Related U.S. Application Data

(63) Continuation of application No. 16/710,818, filed on Dec. 11, 2019, now Pat. No. 10,786,741, which is a (Continued)

(51) Int. Cl.
*A63F 13/792* (2014.01)
*A63F 13/85* (2014.01)
(Continued)

(52) U.S. Cl.
CPC ............ *A63F 13/792* (2014.09); *A63F 13/85* (2014.09); *G06F 16/1805* (2019.01); *H04L 9/0643* (2013.01); *H04L 2209/38* (2013.01)

(58) Field of Classification Search
None
See application file for complete search history.

(56) References Cited

U.S. PATENT DOCUMENTS 9,501,791 B2    11/2016 Dziuk
10,102,526 B1    10/2018 Madisetti
(Continued)

OTHER PUBLICATIONS

William Entriken, Dieter Shirley, Jacob Evans, and Nastassia Sachs, EIP-721: ERC-721 Non-Fungible Token Standard, Jan. 24, 2018, available at https://eips.ethereum.org/EIPS/eip-721. (Year: 2018) (15 pages).

(Continued)

*Primary Examiner* — Ronald Laneau
(74) *Attorney, Agent, or Firm* — Esplin & Associates, PC

(57) ABSTRACT

Systems and methods for transfer of rights pertaining to game assets operate between users of an online gaming platform. Exemplary implementations may: tokenize a game asset into a tokenized game asset; record, on a distributed blockchain, ownership of a beneficiary right to a share resulting from selling the game asset; responsive to a sale of the game asset, transfer the share resulting from the sale to a first beneficiary; responsive to a transfer of ownership of a particular virtual item from the first beneficiary to a second beneficiary, and responsive to a second sale of the game asset, transferring a second share resulting from the second sale to the second beneficiary in accordance with the beneficiary right.

20 Claims, 3 Drawing Sheets

Related U.S. Application Data continuation of application No. 16/212,504, filed on Dec. 6, 2018, now Pat. No. 10,518,178.

(51) Int. Cl.
*G06F 16/18* (2019.01)
*H04L 9/06* (2006.01)

(56) References Cited

U.S. PATENT DOCUMENTS

| | | | |
|---|---|---|---|
| 10,158,479 B2 | 12/2018 | Chapman | |
| 10,171,509 B2 | 1/2019 | Anderson | |
| 10,269,009 B1 | 4/2019 | Winklevoss | |
| 10,518,178 B1 | 12/2019 | Cunningham | |
| 10,726,107 B2 | 7/2020 | Cunningham | |
| 10,786,741 B2 | 9/2020 | Cunningham | |
| 10,946,283 B1* | 3/2021 | Meilich | G06Q 20/363 |
| 10,984,400 B1* | 4/2021 | Koch | G06F 16/27 |
| 11,062,284 B1* | 7/2021 | Cunningham | G06Q 20/407 |
| 2006/0234795 A1 | 10/2006 | Dhunjishaw | |
| 2008/0046222 A1 | 2/2008 | Van Luchene | |
| 2008/0243697 A1 | 10/2008 | Irving | |
| 2009/0076925 A1 | 3/2009 | DeWitt | |
| 2010/0161837 A1 | 6/2010 | Miyajima | |
| 2011/0145602 A1 | 6/2011 | Ginter | |
| 2013/0254125 A1 | 9/2013 | Sanders | |
| 2013/0347100 A1 | 12/2013 | Tsukamoto | |
| 2014/0025563 A1 | 1/2014 | Bennett | |
| 2015/0046590 A1 | 2/2015 | Laubner | |
| 2015/0235039 A1 | 8/2015 | Yoshinari | |
| 2017/0098291 A1 | 4/2017 | Code | |
| 2018/0114403 A1 | 4/2018 | Jayachandran | |
| 2019/0080407 A1 | 3/2019 | Molinari | |
| 2019/0108576 A1 | 4/2019 | Laprade | |
| 2020/0027067 A1 | 1/2020 | Hertzog | |
| 2020/0042989 A1* | 2/2020 | Ramadoss | G06Q 20/102 |
| 2020/0110855 A1 | 4/2020 | Cunningham | |
| 2020/0179810 A1 | 6/2020 | Cunningham | |
| 2020/0293633 A1 | 9/2020 | Cunningham | |
| 2021/0073881 A1* | 3/2021 | Stoddard | G06Q 30/0641 |

OTHER PUBLICATIONS

Ron White, How Computers Work, Oct. 15, 2003, Que Publishing, 7th Ed, p. 4. (Year: 2003).

* cited by examiner

SYSTEMS AND METHODS FOR TRANSFER OF RIGHTS PERTAINING TO GAME ASSETS BETWEEN USERS OF AN ONLINE GAMING PLATFORM

FIELD OF THE DISCLOSURE

The present disclosure relates to systems and methods for transfer of rights pertaining to game assets between users of an online gaming platform.

BACKGROUND

Distributed ledgers are known techniques to produce a secure record or registry of ownership of assets, transactions, and other information. For example, a distributed blockchain is a distributed ledger. Blockchain technology is known, e.g., as used for cryptocurrencies, smart contracts, and other applications for a decentralized database. Tokenization of (digital) objects and/or assets on a distributed blockchain is known, e.g., as used for security tokens, utility tokens, and payment tokens.

SUMMARY

One aspect of the present disclosure relates to a system configured for transfer of rights pertaining to game assets between users of an online gaming platform, the users including a first beneficiary, a second beneficiary, a first user, a second user, and a third user. The system may include one or more hardware processors configured by machine-readable instructions. The processor(s) may be configured to tokenize a game asset into a tokenized game asset. The game asset may be usable within the online gaming platform by an owner of a right to usage within the online gaming platform. The owner of the game asset may be the first user. The tokenized game asset may include a beneficiary right to a share resulting from selling of the game asset. The processor(s) may be configured to record, on a distributed blockchain, ownership of the beneficiary right. The beneficiary right may be owned by the first beneficiary. The ownership of the beneficiary right may be associated with ownership of a particular virtual item within the online gaming platform such that transfer of ownership of the particular virtual item corresponds to a change in the ownership of the beneficiary right. The processor(s) may be configured to, responsive to receipt of information reflecting a sale, e.g., within the online gaming platform, of the game asset from the first user to the second user, transfer the share resulting from the sale to the first beneficiary in accordance with the beneficiary right. The processor(s) may be configured to, responsive to receipt of information reflecting a transfer of ownership of the particular virtual item from the first beneficiary to the second beneficiary, recording, on the distributed blockchain that the beneficiary right is owned by the second beneficiary. The processor(s) may be configured to, responsive to receipt of information reflecting a second sale, e.g., within the online gaming platform, of the game asset from the second user to the third user, transferring a second share resulting from the second sale to the second beneficiary in accordance with the beneficiary right.

Another aspect of the present disclosure relates to a method for transfer of rights pertaining to game assets between users of an online gaming platform, the users including a first beneficiary, a second beneficiary, a first user, a second user, and a third user. The method may include tokenizing a game asset into a tokenized game asset. The game asset may be usable within the online gaming platform by an owner of a right to usage within the online gaming platform. The owner of the game asset may be the first user. The tokenized game asset may include a beneficiary right to a share resulting from selling of the game asset. The method may include recording, on a distributed blockchain, ownership of the beneficiary right. The beneficiary right may be owned by the first beneficiary. The ownership of the beneficiary right may be associated with ownership of a particular virtual item within the online gaming platform such that transfer of ownership of the particular virtual item corresponds to a change in the ownership of the beneficiary right. The method may include, responsive to receipt of information reflecting a sale, e.g., within the online gaming platform, of the game asset from the first user to the second user, transferring the share resulting from the sale to the first beneficiary in accordance with the beneficiary right. The method may include, responsive to receipt of information reflecting a transfer of ownership of the particular virtual item from the first beneficiary to the second beneficiary, recording, on the distributed blockchain that the beneficiary right is owned by the second beneficiary. The method may include, and responsive to receipt of information reflecting a second sale, e.g., within the online gaming platform, of the game asset from the second user to the third user, transferring a second share resulting from the second sale to the second beneficiary in accordance with the beneficiary right.

As used herein, any association (or relation, or reflection, or indication, or correspondency) involving servers, processors, client computing platforms, smart contracts, game assets, ownership rights, usage rights, beneficiary rights, sales, proceeds, virtual items, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
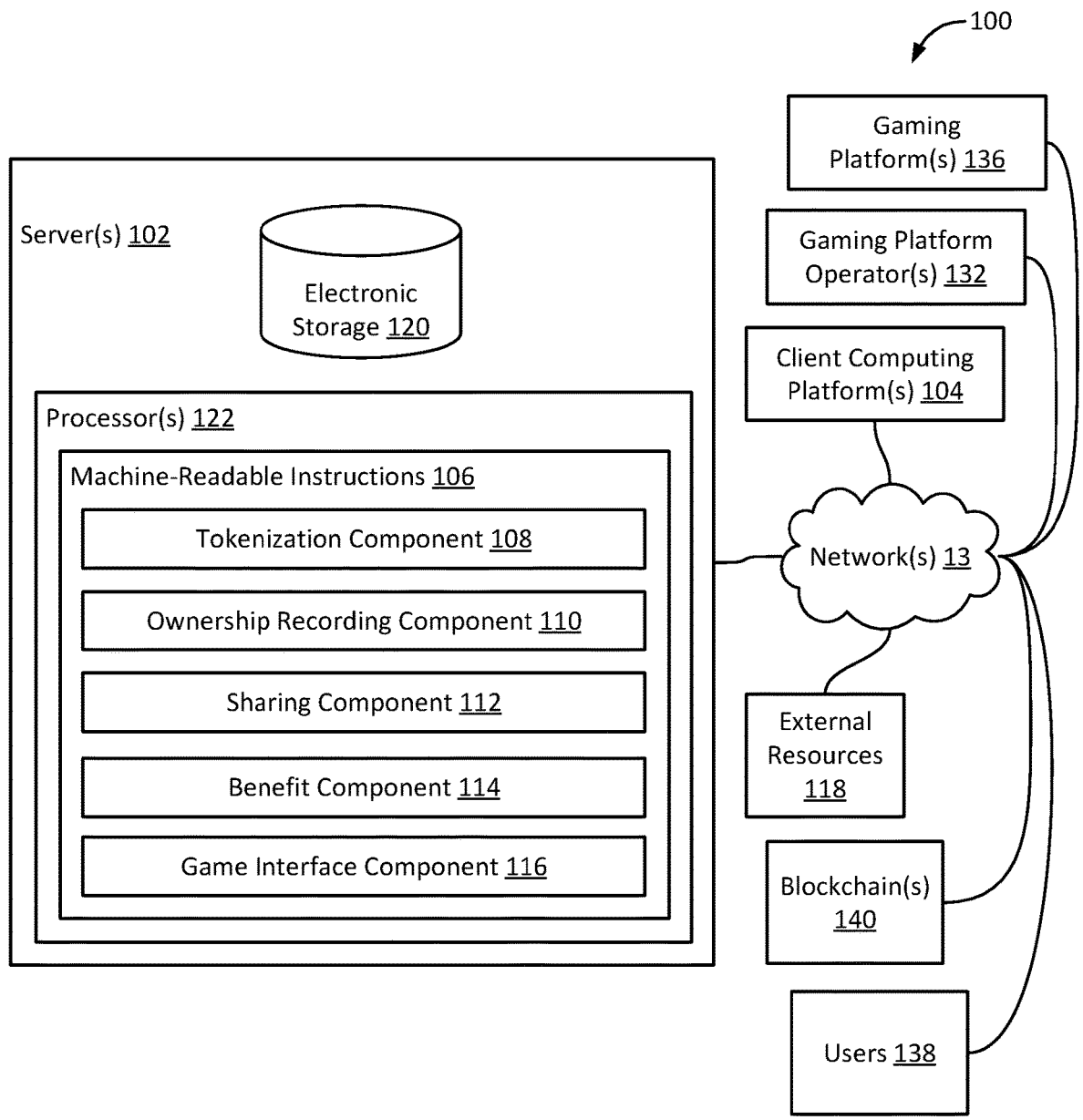
FIG. 1 shows a system configured for transfer of rights pertaining to game assets between users of an online gaming platform, in accordance with one or more implementations.

FIG. 1 illustrates a system 100 configured for transfer of rights pertaining to game assets between users of an online gaming platform, in accordance with one or more implementations. Users 138 may include one or more of a first beneficiary, a second beneficiary, a third beneficiary, a first user, a second user, a third user, a fourth user, and/or other users. In some implementations, beneficiaries do not need to be players of any gaming platform. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

In some implementations, system 100 and/or servers 102 may be configured to communicate with one or more of (online) gaming platform(s) 136, gaming platform operator(s) 132, users 138, blockchain(s) 140, and/or other components and/or users. As used herein, gaming platform 136 may refer to either an individual game, a type of gaming console and its ecosystem, and/or both. Gaming platform operator 132 may refer to a host, operator, owner, and/or other stakeholder of gaming platform 136. Users 138 may include players who play on gaming platform 136.

In some implementations, a distributed blockchain such as blockchain 140 may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts. In some implementations, the distributed computing platform may include electronic storage configured to store part or all of blockchain(s) 140. The smart contracts may be stored on blockchain(s) 140. In some implementations, the distributed computing platform may be Ethereum. In some implementations, the virtual machine may be a Turing-complete and decentralized virtual machine.

A distributed blockchain may act as a decentralized database that stores a registry of assets and transactions across one or more networks. A given asset may be owned by a particular user. An asset may include anything of material value or usefulness that is owned by or on behalf of a person or company, according to some implementations. A right pertaining to an object may be an asset, the object being a physical or a virtual item. Multiple rights may form a set of rights or a bundle of rights that may be transferred and/or otherwise acted on or operated on together. For example, rights may include a right to use, a right to sell, a right to destroy, and/or other rights.

In some implementations, blockchain(s) 140 may record ownership of assets. Alternatively, and/or simultaneously, blockchain(s) 140 may record transactions that modify ownership of assets. A smart contract may be a type of asset. In some implementations, once a smart contract has been added to the distributed blockchain, the smart contract may be referred to as published and/or posted. Elements of blockchain(s) 140 may be grouped together in units that are referred to as blocks. For example, an individual block may include one or more assets and one or more transactions.

Blockchain(s) 140 may be publicly accessible and append-only. In some implementations, existing blocks of a distributed blockchain can substantially not be altered or deleted, unless multiple copies of the distributed blockchain are altered. This is unlikely to happen provided that multiple copies of the distributed blockchain are stored on different computing platforms, e.g., in different geographical locations. The distributed blockchain may be replicated on multiple computing platforms, preferably in multiple different geographical locations.

Server(s) 102 may be configured by machine-readable instructions 106. Machine-readable instructions 106 may include one or more instruction components. The instruction components may include computer program components. The instruction components may include one or more of a tokenization component 108, an ownership recording component 110, a sharing component 112, a benefit component 114, a game interface component 116, and/or other instruction components.

Tokenization component 108 may be configured to tokenize a game asset into a tokenized game asset. Game assets may be (collections and/or packages of) virtual items usable within an online gaming platform, such as gaming platform 136. In some implementations, a game asset may be a level, mission, assignment, chapter, task, mini-game, and/or other package of content that is usable within gaming platform 136. Game assets may be usable within gaming platform 136 by an owner of a right to usage within gaming platform 136. The owner of a first particular game asset may be the first user, the owner of a second particular game asset may be the second user, and so forth.

As used herein, the term tokenization refers to the process of dividing the value of an asset into individual elements (sometimes referred to as tokens, or as tokenized assets). The value may include one or more rights pertaining to the asset and/or its individual elements. The individual elements may be individually exchanged, e.g., through a sale and/or other transaction. For example, some elements of a corporation may be tokenized through shares or stocks. As used in this disclosure, an asset may be tokenized into individual elements that are stored and/or otherwise recorded on blockchain(s) 140. Once recorded, blockchain(s) provides a secure record or registry of ownership of the individual elements (i.e., the tokenized assets).

In some implementations, a tokenized game asset may include various rights, including a beneficiary right to one or more shares resulting from a particular action or activity (such as, e.g., a sale of a particular game asset), e.g., within the online gaming platform, of the particular game asset. As used herein, a share resulting from a particular action or activity may include one or more of a share of the proceeds of the particular action or activity, a fee related to the particular action or activity, a minimum payment triggered by the occurrence of the particular action or activity (or a set of particular actions or activities), and/or another arrangement for payment and/or compensation, including but not limited to combinations of fixed fees, minimum fees, percentages of sales, percentages of profits, and/or other arrangements. The term "share" does not imply or require a percentage or ratio, but rather is intended to signify that beneficiaries receive something of value and/or use. For example, the particular game asset may be a magical sword that a player can use within a particular online gaming platform 136. Ownership of the magical sword within the particular online gaming platform 136 enables a particular player to use the magical sword. In other words, (at least some type of) ownership may correspond to usage rights. For example, ownership of the usage right may be represented by including the magical sword in the inventory of the particular player (and not in the inventories of other players). A tokenized game asset based on, derived from, and/or otherwise related to the magical sword may be a token (say, a sword token) that represents one or more rights pertaining to the magical sword. For example, in some implementations, the one or more rights may include a beneficiary right to a share resulting from selling, e.g., within online gaming platform 136, of the magical sword. For example, in some implementations, the one or more rights may include a beneficiary right to a share resulting from (certain types of) use, within online gaming platform 136, of the magical sword. For example, once the magical sword is sold within online gaming platform 136, the owner of the beneficiary right may receive a certain share resulting from this sale, as defined by the beneficiary right. For example, once the magical sword is exchanged or traded within online gaming platform 136, the owner of the beneficiary right may receive a certain share as defined by the beneficiary right. For example, once the magical sword is used within online gaming platform 136 to create wealth and/or other profits, the owner of the beneficiary right may receive a certain share as defined by the beneficiary right. In some implementations, for example, the beneficiary right may define the share as a certain percentage of the proceeds and/or profit. The certain percentage may be 1%, 2%, 3%, 4%, 5%, 10%, 15%, 20%, 25%, and/or another percentage. In some implementations, for example, the beneficiary right may define the share as a fixed fee and/or minimum fee of a certain amount. In some implementations, for example, the beneficiary right may define the share as a combination of a fee and a percentage, according to some arrangement for payment. In some implementations, ownership of the sword token and/or any one or more rights pertaining to the magical sword may be recorded, e.g. on blockchain(s) 140. In some implementations, a particular game asset may correspond to multiple beneficiary rights that are owned by multiple beneficiaries. For example, a share resulting from a particular action or activity may be split in any way among multiple beneficiaries.

Ownership recording component 110 may be configured to record ownership pertaining to assets. In some implementations, ownership recording component 110 may be configured to record ownership on a distributed blockchain such as blockchain(s) 140. In some implementations, ownership recording component 110 may be configured to record ownership of one or more rights pertaining to assets, including but not limited to game assets and/or other virtual items usable within an online gaming platform, such as gaming platform 136. For example, the one or more rights may include a beneficiary right to a share resulting from selling (and/or other specific use), e.g., within gaming platform 136, of a particular game asset.

In some implementations, tokenizing a game asset into a tokenized game asset may include converting ownership rights regarding the game asset into one or more tokens that are stored on blockchain(s) 140. In some implementations, the ownership rights may be managed through a smart contract on the distributed blockchain. One or more beneficiary rights may be owned by a first beneficiary, a second beneficiary, and/or other beneficiaries. In some implementations, ownership of the beneficiary right may be associated with ownership of a particular virtual item within online gaming platform 136 (or another online gaming platform) such that transfer of ownership of the particular virtual item corresponds to a change in the ownership of the beneficiary right. For example, the sword token may be associated with a particular virtual coin within gaming platform 136. The player who owns the particular coin within gaming platform 136 may also be the owner of the beneficiary right pertaining to the magical sword. Accordingly, transferring the particular coin to another player may also transfer ownership of the beneficiary right pertaining to the magical sword. In some implementations, beneficiaries may own beneficiary rights without being users of gaming platform 136.

Recording the ownership of the beneficiary right may include posting a message on the distributed blockchain. In some implementations, ownership of beneficiary rights may be managed through smart contracts on the distributed blockchain. In some implementations, ownership recording component 110 may be configured to generate, post, and/or otherwise use smart contracts on blockchain(s) 140. For example, ownership of the beneficiary right of a particular tokenized game asset may be managed through a particular smart contract on blockchain 140. For example, in some types of blockchains, users may be identified by unique identifiers, such as a (blockchain) address and/or an account identifier. For example, the first beneficiary may be associated with a first beneficiary address, the second beneficiary may be associated with a second beneficiary address, and so forth. Effectuating the transfer within gaming platform 136 of the particular virtual item from the first beneficiary (i.e., a first player) to the second beneficiary (i.e., a second player) may include effectuating a change in the beneficiary address included in the particular smart contract from the first beneficiary address to the second beneficiary address. In some implementations, the share resulting from selling of a particular game asset in accordance with the beneficiary right may be transferred to the beneficiary address in the particular smart contract.

Figure 3:
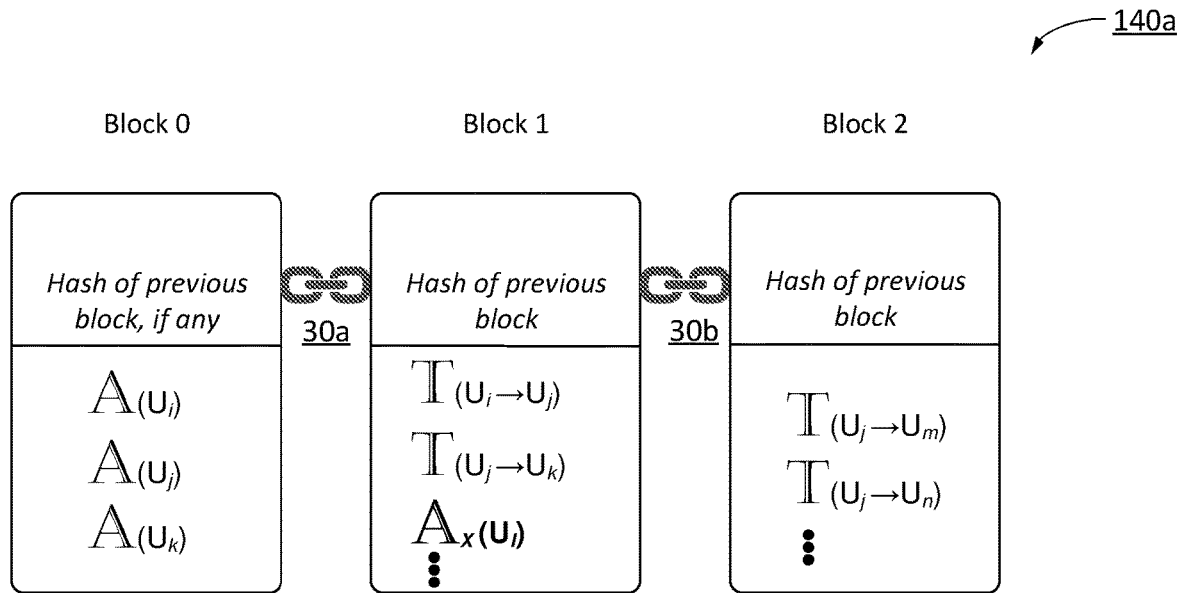
FIGS. 3 and 4 illustrate exemplary distributed blockchains, in accordance with use by one or more implementations.

By way of non-limiting example, FIG. 3 illustrates a blockchain 140a that includes a block 0, a block 1, and a block 2. As time progresses, more blocks may be added to blockchain 140a. The blocks within blockchain 140a are ordered. In block 0, three assets (indicated by a capital "A") are generated and/or assigned to three users or participants: a first asset is assigned to user i ($U_i$), a second asset is assigned to user j ($U_j$), and a third asset is assigned to user k ($U_k$). Block 1 is connected to block 0 (as indicated by a link 30a), for example by including an address of block 1 in block 0, or vice versa. Likewise, block 1 is connected to block 2, as indicated by a link 30b.

In block 1, one asset (labeled $A_x$) is generated and/or assigned to user l ($U_l$). For example, the asset in block 1 may be a beneficiary right included in a particular tokenized game asset of a particular game asset within an online gaming platform. Additionally, block 1 includes two transactions (indicated by a capital "T"): a first transaction from user i to user j, and a second transaction from user j to user k. Block 2 includes a first transaction from user j to user m, and a second transaction from user j to user n. In some implementations, based on the contents of the blocks, any user of blockchain 140a may determine the current assets of blockchain 140a, and the balances of any user. In some implementations, the balance of a particular user may be verified prior to adding a transaction that reduces that particular user's balance. For example, an individual user may not be allowed to transfer more assets than the individual user owns.

Referring to FIG. 1, sharing component 112 may be configured to transfer payments and/or resources between users of blockchain(s) 140 and/or gaming platform 136. In some implementations, sharing component 112 may be configured to transfer and/or otherwise provide one or more shares between users of blockchain(s) 140 and/or gaming platform 136. The shares may include a first share, a second share, a third share, and so forth. For example, the first share may correspond to a first sale or other activity pertaining to one or more game assets, the second share may correspond to a second sale or other activity pertaining to one or more game assets, the third share may correspond to a third sale or other activity pertaining to one or more game assets, and so forth. In some implementations, the first share, second share, and third share may be the same, and may be defined in the same way. In some implementations, the first share, second share, and third share may be different, and/or may be defined according to a different rule, formula, and/or other arrangement. In some implementations, sharing component 112 may be configured to share (e.g. proceeds of sales) responsive to receipt of certain information, including but not limited to information reflecting a particular action within gaming platform 136, including but not limited a sale of a game asset. For example, sharing component 112 may be configured to operate responsive to a sale, within gaming platform 136, of a particular game asset from a first user to a second user. For example, sharing component 112 may be configured to operate by transferring a share resulting from the sale to one or more beneficiaries in accordance with the beneficiary rights. For example, a share resulting from a sale may be transferred to the first beneficiary in accordance with the beneficiary right. Effectuating the sale of the game asset from the first user to the second user may include transferring the game asset from the first inventory (of the first user) to the second inventory (of the second user).

Figure 4:
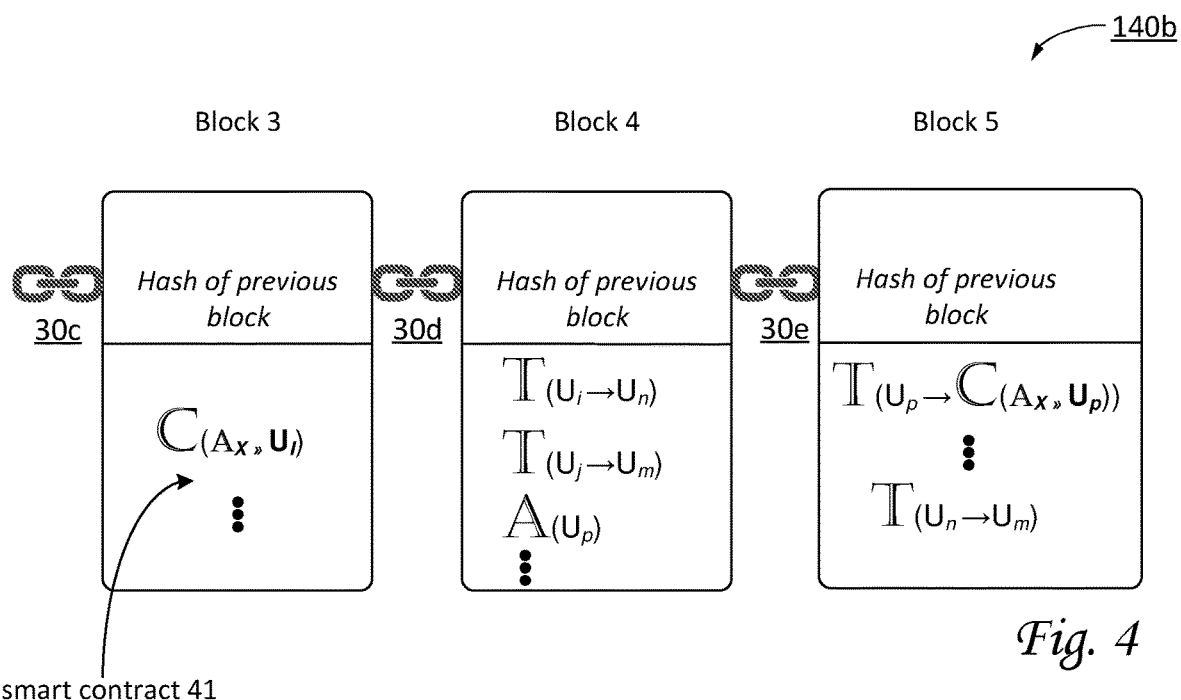

By way of non-limiting example, FIG. 4 illustrates a blockchain 140b that includes the same blocks as blockchain 140a of FIG. 3, plus additional blocks (block 3, block 4, block 5) that have been appended to the blockchain. Block 3 may be connected to block 2 (as indicated by a link 30c), block 4 may be connected to block 3 (as indicated by a link 30d), and block 5 may be connected to block 4 (as indicated by a link 30e). In block 3, a smart contract 41 (indicated by a capital "C") is posted. For example, smart contract 41 may have been generated by a component similar to ownership recording component 110, and may have been posted to blockchain 140b by a component similar to ownership recording component 110 (shown in FIG. 1). Referring to FIG. 4, for example, smart contract may define that asset $A_x$ (the beneficiary right) is currently owned by user 1 ($U_l$). In some implementations, a smart contract may be appended to a distributed blockchain as soon as at least one participant of the smart contract is known. In some implementations, a smart contract may be appended to a distributed blockchain as soon as both or all participants are known and/or agreed upon. In block 4, one asset is generated and/or assigned to user p ($U_p$). Additionally, block 4 includes two transactions (indicated by a capital "T"): a first transaction from user i to user n, and a second transaction from user j to user m. For example, the first transaction may represent a purchase of a first virtual item by user n, and the second transaction may represent a purchase of a second virtual item by user m. For example, the first virtual item of the first transaction in block 4 may be the particular game asset related to asset $A_x$ (i.e., related and/or corresponding to the beneficiary right) in FIG. 3. As a result of the first transaction, user 1 ($U_l$) may receive a share resulting from the first transaction, in accordance with smart contract 41. In some implementations, the share resulting from a sale may be sent and/or otherwise transferred to smart contract 41, and smart contract 41 may be configured to transfer that share to the current beneficiary, which is user 1 ($U_l$). Block 5 includes two transactions (indicated by a capital "T"): a first transaction from user p to the same smart contract as depicted in block 3, and a second transaction from user n to user m. For example, the first transaction may represent a change in the beneficiary address included in smart contract 41, from user 1 ($U_l$) to user p ($U_p$). The second transaction may represent a purchase of a particular virtual item from user n ($U_n$) by user m ($U_m$). For example, the particular virtual item of the second transaction in block 5 may be the particular game asset related to asset $A_x$ (i.e., related and/or corresponding to the beneficiary right) in FIG. 3. As a result of the first and second transaction in block 5, user p ($U_p$) may receive a share resulting from the second transaction in block 5, in accordance with smart contract 41. In some implementations, the share may be sent and/or otherwise transferred to smart contract 41, and smart contract 41 may be configured to transfer that share to the current beneficiary, which in block 5 is user p ($U_p$).

Referring to FIG. 1, benefit component 114 may be configured to record ownership of beneficiary rights on blockchain 140. In some implementations, benefit component 114 may be configured to, responsive to receipt of information reflecting a transfer of ownership of a particular virtual item from the first beneficiary to the second beneficiary, record on blockchain 140 that the beneficiary right is owned by the second beneficiary. Effectuating the transfer of the particular virtual item from the first beneficiary to the second beneficiary may include transferring the particular virtual item from the first beneficiary inventory to the second beneficiary inventory. For example, effectuating the transfer of the particular virtual item from the first beneficiary to the second beneficiary may include transferring the particular virtual item from the first beneficiary inventory to the second beneficiary inventory within gaming platform 136. In some implementations, the transfer of ownership of the particular virtual item from the first beneficiary to the second beneficiary may be caused by a sale, e.g., within the online gaming platform. In some implementations, ownership of beneficiary rights may be recorded on blockchain 140 through smart contracts. For example, a certain transaction may effectuate a change in the beneficiary address included in a smart contract.

Sharing component 112 may be configured to, responsive to receipt of information reflecting a second sale of a particular game asset from the second user to a third user, and further responsive to a change in beneficiary, transfer a second share resulting from the second sale to the current, second beneficiary in accordance with the beneficiary right. In some implementations, the second share may include a portion of the proceeds of the second sale. For example, refer to the transactions in block 5 in FIG. 4. In some implementations, sharing component 112 may be configured to, responsive to a second sale of a particular game asset from the second user to a third user, and further responsive to a change in beneficiary, transfer a fee from the second user to the current beneficiary in accordance with the beneficiary right.

In some implementations, the first user may be associated with a first inventory including a first set of virtual items usable within the online gaming platform. In some implementations, a second user may be associated with a second inventory including a second set of virtual items usable within the online gaming platform, and so forth. In some implementations, the first beneficiary may be associated with a first beneficiary inventory including virtual items usable within the online gaming platform. In some implementations, the second beneficiary may be associated with a second beneficiary inventory including virtual items usable within the online gaming platform, and so forth. In some implementations, the smart contract may include a beneficiary address.

Game interface component 116 may be configured to facilitate interaction between blockchain(s) 140, gaming platform 136, and/or system 100. For example, in some implementations, game interface component 116 may be configured to transfer information to system 100 and/or blockchain(s) 140 that reflect particular activity (e.g., a sale) within gaming platform 136. For example, in some implementations, game interface component 116 may be configured to transfer information to system 100 and/or blockchain(s) 140 that reflect particular activity (e.g., a transfer of ownership) within gaming platform 136 (e.g., a transfer of ownership of a tokenized game asset, such as, e.g., a sword token). For example, in some implementations, game interface component 116 may be configured to transfer information to system 100 and/or gaming platform 136 reflect particular activity (e.g., a transaction) within blockchain(s) 140. In some implementations, operations of a particular gaming platform and a particular blockchain may be fully integrated such that information reflecting any such operations may be available to both the particular gaming platform and the particular blockchain.

In some implementations, server(s) 102, client computing platform(s) 104, and/or external resources 118 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

A given client computing platform 104 may include one or more processors configured to execute computer program components. The computer program components may be configured to enable an expert or user associated with the given client computing platform 104 to interface with system 100 and/or external resources 118, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information outside of system 100, external entities participating with system 100, and/or other resources. In some implementations, some or all of the functionality attributed herein to external resources 118 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute components 108, 110, 112, 114, and/or 116, and/or other components. Processor(s) 122 may be configured to execute components 108, 110, 112, 114, and/or 116, and/or other components by software; hardware; firmware; some combination of software, hardware, and/or firmware; and/or other mechanisms for configuring processing capabilities on processor(s) 122. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 122 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 122 may be configured to execute one or more additional components that may perform some or all of the functionality attributed below to one of components 108, 110, 112, 114, and/or 116.

Figure 2:
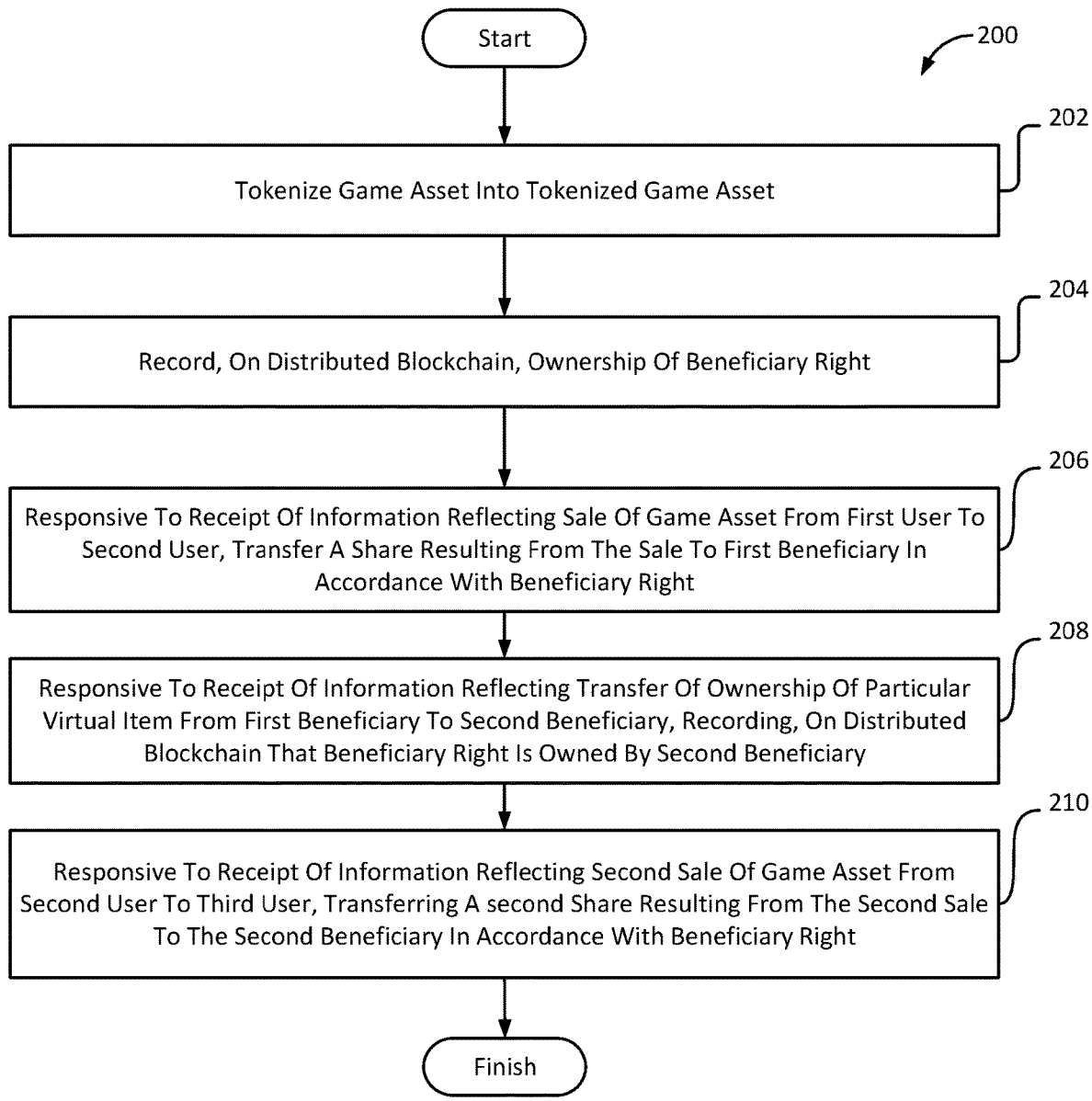
FIG. 2 includes a flow chart of a method for transfer of rights pertaining to game assets between users of an online gaming platform, in accordance with one or more implementations.

FIG. 2 illustrates a method 200 for transfer of rights pertaining to game assets between users of an online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include tokenizing a game asset into a tokenized game asset. The game asset may be usable within the online gaming platform by an owner of a right to usage within the online gaming platform. The owner of the game asset may be the first user. The tokenized game asset may include a beneficiary right to one or more shares resulting from selling of the game asset. Operation 202 may be performed by one or more hardware processors configured by machine-readable instructions including a component that is the same as or similar to tokenization component 108, in accordance with one or more implementations.

An operation 204 may include recording, on a distributed blockchain, ownership of the beneficiary right. The beneficiary right may be owned by the first beneficiary. The ownership of the beneficiary right may be associated with ownership of a particular virtual item within the online gaming platform such that transfer of ownership of the particular virtual item corresponds to a change in the ownership of the beneficiary right. Operation 204 may be performed by one or more hardware processors configured by machine-readable instructions including a component that is the same as or similar to ownership recording component 110, in accordance with one or more implementations.

An operation 206 may include responsive to receipt of information reflecting a sale, e.g., within the online gaming platform, of the game asset from the first user to the second user, transferring a share resulting from the sale to the first beneficiary in accordance with the beneficiary right. Operation 206 may be performed by one or more hardware processors configured by machine-readable instructions including a component that is the same as or similar to sharing component 112, in accordance with one or more implementations.

An operation 208 may include responsive to receipt of information reflecting a transfer of ownership of the particular virtual item from the first beneficiary to the second beneficiary, recording, on the distributed blockchain that the beneficiary right is owned by the second beneficiary. Operation 208 may be performed by one or more hardware processors configured by machine-readable instructions including a component that is the same as or similar to benefit component 114, in accordance with one or more implementations.

An operation 210 may include and responsive to receipt of information reflecting a second sale, e.g., within the online gaming platform, of the game asset from the second user to the third user, transferring a second share resulting from the second sale to the second beneficiary in accordance with the beneficiary right. Operation 210 may be performed by one or more hardware processors configured by machine-readable instructions including a component that is the same as or similar to sharing component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for transfer of rights pertaining to game assets between users of an online gaming platform, the users including a first beneficiary, a second beneficiary, a first user, and a second user, wherein the first user is associated with a first inventory including a first set of virtual items usable within the online gaming platform, wherein the second user is associated with a second inventory including a second set of virtual items usable within the online gaming platform, wherein the game assets include a first game asset usable within the online gaming platform by an owner of a right to usage within the online gaming platform, wherein the owner of the first game asset is the first user, wherein the first game asset corresponds to a first tokenized game asset that includes a beneficiary right to a beneficiary share resulting from sales of the first game asset, the system comprising:

one or more hardware processors configured by machine-readable instructions to:

record, on a distributed blockchain, ownership of the beneficiary right, wherein the beneficiary right is owned by the first beneficiary, wherein the ownership of the beneficiary right is associated with ownership of a particular virtual item within the online gaming platform such that transfer of the ownership of the particular virtual item corresponds to a change in the ownership of the beneficiary right;

receive information that has been recorded on the distributed blockchain, wherein the received information reflects a sale of the first game asset from the first user to the second user;

responsive to receipt of the information reflecting the sale of the first game asset from the first user to the second user, transfer the beneficiary share to the first beneficiary in accordance with the beneficiary right;

receive second information reflecting a transfer of the ownership of the particular virtual item from the first beneficiary to the second beneficiary; and responsive to receipt of the second information reflecting the transfer of the ownership of the particular virtual item from the first beneficiary to the second beneficiary, record on the distributed blockchain that the beneficiary right is owned by the second beneficiary such that the beneficiary share resulting from subsequent sales of the first game asset will be transferred to the second beneficiary in accordance with the beneficiary right.

2. The system of claim 1, wherein the first game asset is a virtual item usable within the online gaming platform, and wherein the sale occurs within the online gaming platform.

3. The system of claim 1, wherein a third user is associated with a third inventory including a third set of virtual items usable within the online gaming platform, and wherein effectuation of a second sale of the first game asset from the second user to the third user includes a transfer of the first game asset from the second inventory to the third inventory, wherein the one or more hardware processors are further configured to:

responsive to receipt of information reflecting the second sale, transfer a second share resulting from the second sale to the second beneficiary in accordance with the beneficiary right.

4. The system of claim 1, wherein the first beneficiary is associated with a first beneficiary inventory including virtual items usable within the online gaming platform, wherein the second beneficiary is associated with a second beneficiary inventory including virtual items usable within the online gaming platform, and wherein effectuation of the transfer of the ownership of the particular virtual item from the first beneficiary to the second beneficiary includes a transfer of the particular virtual item from the first beneficiary inventory to the second beneficiary inventory.

5. The system of claim 1, wherein recording the ownership of the beneficiary right includes posting a message on the distributed blockchain.

6. The system of claim 1, wherein the ownership of the beneficiary right is managed through a smart contract on the distributed blockchain, wherein the smart contract includes a beneficiary address, wherein the share resulting from selling of the first game asset in accordance with the beneficiary right is transferred to the beneficiary address.

7. The system of claim 6, wherein the first beneficiary is associated with a first beneficiary address, wherein the second beneficiary is associated with a second beneficiary address, and wherein effectuating the transfer of the particular virtual item from the first beneficiary to the second beneficiary includes effectuating a change in the beneficiary address included in the smart contract from the first beneficiary address to the second beneficiary address.

8. The system of claim 1, wherein the transfer of ownership of the particular virtual item from the first beneficiary to the second beneficiary is caused by a sale within the online gaming platform.

9. The system of claim 1, wherein the one or more hardware processors are further configured by machine-readable instructions to tokenize the first game asset into the first tokenized game asset, wherein the tokenizing includes converting ownership rights regarding the first game asset into one or more tokens that are stored on the distributed blockchain.

10. The system of claim 9, wherein the ownership rights regarding the first game asset are managed through a smart contract on the distributed blockchain.

11. A method for transfer of rights pertaining to game assets between users of an online gaming platform, the users including a first beneficiary, a second beneficiary, a first user, and a second user, wherein the first user is associated with a first inventory including a first set of virtual items usable within the online gaming platform, wherein the second user is associated with a second inventory including a second set of virtual items usable within the online gaming platform, wherein the game assets include a first game asset usable within the online gaming platform by an owner of a right to usage within the online gaming platform, wherein the owner of the first game asset is the first user, wherein the first game asset corresponds to a first tokenized game asset that includes a beneficiary right to a beneficiary share resulting from sales of the first game asset, wherein the method is implemented in a computer system that includes one or more hardware processors, the method comprising:

recording, by the one or more hardware processors, on a distributed blockchain, ownership of the beneficiary right, wherein the beneficiary right is owned by the first beneficiary, wherein the ownership of the beneficiary right is associated with ownership of a particular virtual item within the online gaming platform such that transfer of the ownership of the particular virtual item corresponds to a change in the ownership of the beneficiary right;

receiving, by the one or more hardware processors, information that has been recorded on the distributed blockchain, wherein the received information reflects a sale of the first game asset from the first user to the second user;

responsive to receipt of the information reflecting the sale of the first game asset from the first user to the second user, transferring, by the one or more hardware processors, the beneficiary share to the first beneficiary in accordance with the beneficiary right;

receiving, by the one or more hardware processors, second information reflecting a transfer of the ownership of the particular virtual item from the first beneficiary to the second beneficiary; and responsive to receipt of the second information reflecting the transfer of the ownership of the particular virtual item from the first beneficiary to the second beneficiary, recording on the distributed blockchain, by the one or more hardware processors, that the beneficiary right is owned by the second beneficiary such that the beneficiary share resulting from subsequent sales of the first game asset will be transferred to the second beneficiary in accordance with the beneficiary right.

12. The method of claim 11, wherein the first game asset is a virtual item usable within the online gaming platform, and wherein the sale occurs within the online gaming platform.

13. The method of claim 11, wherein a third user is associated with a third inventory including a third set of virtual items usable within the online gaming platform, and wherein effectuating a second sale of the first game asset from the second user to the third user includes transferring the first game asset from the second inventory to the third inventory, the method further comprising:

responsive to receipt of information reflecting the second sale, transferring a second share resulting from the second sale to the second beneficiary in accordance with the beneficiary right.

14. The method of claim 11, wherein the first beneficiary is associated with a first beneficiary inventory including virtual items usable within the online gaming platform, wherein the second beneficiary is associated with a second beneficiary inventory including virtual items usable within the online gaming platform, and wherein effectuating the transfer of the ownership of the particular virtual item from the first beneficiary to the second beneficiary includes transferring the particular virtual item from the first beneficiary inventory to the second beneficiary inventory.

15. The method of claim 11, wherein recording the ownership of the beneficiary right includes posting a message on the distributed blockchain.

16. The method of claim 11, wherein the ownership of the beneficiary right is managed through a smart contract on the distributed blockchain, wherein the smart contract includes a beneficiary address, wherein the share resulting from selling of the first game asset in accordance with the beneficiary right is transferred to the beneficiary address.

17. The method of claim 16, wherein the first beneficiary is associated with a first beneficiary address, wherein the second beneficiary is associated with a second beneficiary address, and wherein effectuating the transfer of the particular virtual item from the first beneficiary to the second beneficiary includes effectuating a change in the beneficiary address included in the smart contract from the first beneficiary address to the second beneficiary address.

18. The method of claim 11, wherein the transfer of ownership of the particular virtual item from the first beneficiary to the second beneficiary is caused by a sale within the online gaming platform.

19. The method of claim 11, further comprising tokenizing the first game asset into the first tokenized game asset, wherein tokenizing includes converting ownership rights regarding the first game asset into one or more tokens that are stored on the distributed blockchain.

20. The method of claim 19, wherein the ownership rights regarding the first game asset are managed through a smart contract on the distributed blockchain.

\* \* \* \* \*